US006444742B1

(12) United States Patent
Rong et al.

(10) Patent No.: US 6,444,742 B1
(45) Date of Patent: Sep. 3, 2002

(54) POLYOLEFIN/CLAY NANOCOMPOSITES AND PROCESS FOR THE PREPARATION THEREOF

(75) Inventors: Junfeng Rong, Beijing (CN); Zhenhua Jing, Beijing (CN); Xiaoyu Hong, Beijing (CN); Wei Zhang, Beijing (CN)

(73) Assignees: China Petrochemical Corporation, Beijing (CN); Research Institute of Petroleum Processing SINOPEC, Beijing (CN)

(*) Notice: Subject to any disclaimer, the term of this patent is extended or adjusted under 35 U.S.C. 154(b) by 0 days.

(21) Appl. No.: 09/449,987

(22) Filed: Nov. 26, 1999

(30) Foreign Application Priority Data

Nov. 26, 1998 (CN) .......................................... 98125042

(51) Int. Cl.[7] ................................................. C08K 3/34
(52) U.S. Cl. ...................... 524/445; 526/129; 526/126; 526/348
(58) Field of Search .................. 524/445; 526/126, 526/129, 160, 348, 348.2, 348.5, 348.6, 943; 502/134

(56) References Cited

U.S. PATENT DOCUMENTS 3,578,629 A * 5/1971 McManimie ................. 260/41
4,187,210 A * 2/1980 Howard, Jr. ............. 260/42.14
5,143,549 A * 9/1992 Howard, Jr. ................. 106/499
5,352,732 A  10/1994 Howard
5,973,084 A * 10/1999 Suga et al. .................. 526/129
5,998,039 A * 12/1999 Tanizaki et al. ............. 428/516

FOREIGN PATENT DOCUMENTS

| CN | 1044772 A | 8/1990 |
| CN | 1138593 A | 12/1996 |
| EP | 874005 A1 * | 10/1998 |
| EP | 1002814 A1 * | 5/2000 |

OTHER PUBLICATIONS

Kawasumi, M; Hasegawa, N; Kato, M; Usuki, A; Okada, A Macromolecules 1997, 30, 6333–6338.*

* cited by examiner

Primary Examiner—Edward J. Cain
Assistant Examiner—Katarzyna W. Lee
(74) Attorney, Agent, or Firm—Finnegan, Henderson, Farabow, Garrett, & Dunner, L.L.P.

(57) ABSTRACT

Disclosed are polyolefin/clay nanocomposites, comprising 40 to 99.9% by weight of polyolefins and 0.1 to 60% by weight of sepiolite-palygorskite type clays selected from the group essentially consisting of sepiolite and attapulgite. The nanocomposites in accordance with the present invention have excellent mechanical properties and thermal resistance. Also disclosed is a process for preparing the polyolefin/clay nanocomposites according to the present invention.

10 Claims, 2 Drawing Sheets

POLYOLEFIN/CLAY NANOCOMPOSITES AND PROCESS FOR THE PREPARATION THEREOF

FIELD OF THE INVENTION

The present invention relates to polyolefin/clay nanocomposites, more particularly, to poly-α-olefin/clay nanocomposites, and to a process for the preparation of the same.

BACKGROUND OF THE INVENTION

The conventional process for preparing thermoplastic composite materials is either dry-blending polymers with filling materials or adding filling materials into a melt of polymers and then mixing them. The resulting materials are disadvantageous for non-uniform distribution of the filling materials in the polymer matrix, thus largely decreasing their strength compared to the polymers containing no filling materials.

By filling polymers with superfine inorganic compounds, the resulting composite materials can have largely improved properties, and however, when the filling materials have a particle size less than 0.1 micron, it is difficult to have the filling materials dispersed in nanometeric scales by using the conventional blending process and only a micro-dispersed composite material can be prepared for very large self-aggregating force among the particles caused by very large surface areas. On the other hand, polyolefin materials with high or ultrahigh molecular weight have excellent mechanical properties and their application fields are being gradually broadened, however, when they are modified with superfine inorganic materials, the outstanding problem encountered is large power consumption and non-uniformity of the resulting composite materials.

In order to effectively solve the problem in terms of uniform dispersion of filling materials within the polymer matrix, a novel process, i.e. in-situ polymerization-composition, is proposed, in which a component having catalytic activity is supported on filling materials having high dispersibility and the polymerization reaction is then carried out on the surface of the filling materials to obtain a composite material. For example, U.S. Pat. No. 5,352,732 disclosed a homogeneous composite comprising (a) 10 to 99.5% by weight of an ultrahigh molecular weight linear polyethylene having a molecular weight of at least about 400,000 and (b) 0.5 to 90% by weight of at least one inorganic filler compound having a neutral-to-acidic surface, said filler compound being an inorganic compound selected from the group consisting of alumina hydrates, silicas, calcium carbonate, hydroxyapatite, calcium hydrogen phosphate and clays. The composite of '732 is prepared by supporting a transition metal as active ingredient onto the surface of the inorganic filler and then carrying out polymerization reaction on said surface. While the mechanical properties of said composite are improved to some extent, the manufacturing process is relatively complicated and the thermal treatment at high pressure is necessary after polymerization.

Chinese Patent Application Publication No. CN 1138593A discloses a polyamide/clay nanocomposite, prepared by intercalation polymerization method, in which a clay having cationic exchange capacity is mixed with a lactam monomer in the presence of a dispersing medium, the cationic exchange reaction and monomer intercalation reaction are carried out in the stabilized colloidal dispersion system formed with stirring at high speed, and then the lactam is polymerized by adding a catalyst, to obtain the composite. The clay used in the synthesis of said composite is montmorillonite.

An object of the present invention is to provide a polyolefin/clay nanocomposite, which has excellent mechanical properties and thermal resistance.

Another object of the present invention is to provide a process for the preparation of the polyolefin/clay nanocomposite according to the present invention, which is simpler compared to the processes employed in the prior art.

These and other objects, features and advantages of the present invention will be readily apparent to those skilled in the art from the following description taken in connection with the accompanying drawings.

SUMMARY OF THE INVENTION

Figure 1:
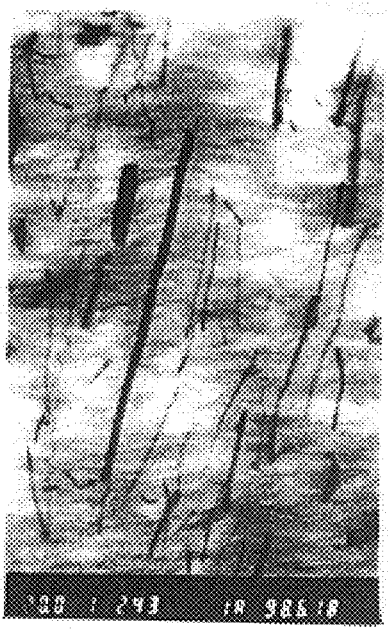
FIG. 1 is a transmission electron microscopic(TEM) image of a sample of the composite prepared in Example 1 of the present invention(at a magnification of 20,000)

The composite according to the present invention comprises from 40 to 99.9% by weight of polyolefins and from 0.1 to 60% by weight of a sepiolite-palygorskite type clay. The content of said clay in the composite according to the present invention is preferably from 0.1 to 40% by weight, most preferably from 1.0 to 10% by weight.

The composite according to the present invention is prepared by a process comprising:

(a) calcining the sepiolite-palygorskite type clay in an atmosphere of air or an inert gas at a temperature of 100 to 850° C., preferably 300 to 850° C., for 0.5 to 10.0 hours;

(b) suspending thus-calcined clay in an inert hydrocarbon solvent and then reacting with a transition metal compound at a temperature of 0 to 200° C. for 0.5 to 6.0 hours to obtain a solid product, in which the transition metal compound is used in an amount of 0.05 to 100 millimoles, preferably 0.05 to 50 millimoles, per gram of clay; and (c) polymerizing an olefin at a temperature of 20 to 150° C., preferably 60 to 90° C., with the solid product from step (b) as the catalyst and an organic aluminum compound as the co-catalyst.

DETAILED DESCRIPTION OF THE INVENTION

Composite of the Invention

The polyolefin employed in the composite according to the present invention is preferably polymers of α-$C_2$~$C_6$ olefins, more preferably polyethylenes. Said polyethylenes may be high or ultrahigh molecular weight polyethylenes, with a weight-average molecular weight of $20\times10^4$ to $600\times10^4$, preferably $40\times10^4$ to $600\times10^4$. Also suitable are copolymers of ethylene with at least one comonomer selected from the group consisting of propylene, 1-butene, 1-pentene, 1-hexene and 1 octene.

The sepiolite-palygorskite type clay used in the composite according to the present invention is any one selected from the group consisting of sepiolite, palygorskite and attapulgite, with sepiolite or attapulgite being preferred.

The sepiolite-palygorskite type clays are a class of hydrated magnesium aluminosilicates, each layer of which is silica tetrahedral arrays having two or three double chains per edge, with five or eight alumina octahedral sheets sandwiched therebetween, and the unit layers are linked by oxygen atoms to form a crystal structure containing channels. Therefore, the sepiolite-palygorskite type clays have a crystal structure between a chain structure and a layer structure, of which the monocrystals are in the forms of fiber, rod or needle, with different degrees of development, and have a diameter of about 10 to 100 nanometers, some of which being as long as several microns to several tens of microns. This class of clays includes sepiolite, palygorskite and attapulgite.

The unit layers of sepiolite have three double-chained silica tetrahedral sheets at each of the upper edges and the bottom edges, with eight alumina octahedral sheets sandwiched therebetween. The unit layers are linked by oxygen atoms to form a crystal structure containing channels. The chemical formula of sepiolite is $Si_{12}Mg_8O_{30}(OH)_4(OH_2)_4 \cdot 8H_2O$.

Palygorskite and attapulgite have the same chemical compositions and crystal structures, but there are some differences in their natures. For example, palygorskite has good crystallization property, longer fibers and soft appearance; and attapulgite has poor crystallization property, very short fibers, tight appearance and high content of iron. Therefore, attapulgite is a subspecies of palygorskite. The unit layers of palygorskite have two double-chained silica tetrahedral sheets at each of the upper edges and the bottom edges, with five alumina octahedral sheets sandwiched therebetween. The unit layers are linked by oxygen atoms to form a crystal structure containing channels. The chemical formula of palygorskite is $Si_8Mg_5O_{20}(OH)_2(OH_2)_4 \cdot 4H_2O$.

Preparation of the Composite of the Invention

The above process for the preparation of the composite according to the present invention may additionally comprise a step ($a_1$), in which said clay calcined in step (a) is treated with an alkyl metal compound, prior to being used for steps (b) and (c). Particularly, in step ($a^1$), the calcined clay from step (a) is suspended in an inert hydrocarbon solvent, the alkyl metal compound is added in an amount of 0.05 to 100 millimoles per gram of clay to the resulting suspension and then the resulting mixture is reacted at a temperature of 0 to 200° C. for 0.5 to 6.0 hours.

Prior to use, various clays may be subjected to pretreatment, if necessary, depending on the purity of the natural crude minerals. The purpose of pretreatment is to remove non-clay impurities, such as quartz sand, calcium carbonate and the like. Said pretreatment can be carried out in a manner as described in Chinese Patent Application Publication No. CN1044772A.

The Clay used in the present invention may be in powdered form, particulate form or spherical form. The clay in spherical form may be formed by spray drying, with a diameter of 20 to 80 microns.

The inert gas used in step (a) may be nitrogen, helium or argon, with nitrogen being preferred.

The transition metal compounds used in step (b) may be one of halides, oxyhalides, $C_1$–$C_{12}$alkoxyhalides or hydrohalides of a transition metal selected from the group consisting of titanium(Ti), zirconium(Zr), hafnium(Hf), vanadium(V), nickel(Ni), scandium(Sc), niobium(Nb) and tantalum(Ta), or the mixtures of any two of them. Preferred are halides or oxyhalides of Ti or V, such as $TiCl_4$, $TiCl_3$, $Ti(OCH_3)Cl_3$, $Ti(OC_6H_5)Cl_3$, or $Ti(OCOC_6H_5)Cl_3$, with $TiCl_4$ being more preferred.

The inert hydrocarbon solvents used in the process according to the present invention may be $C_5$–$C_{10}$ alkanes, gasoline, kerosine or petroleum ether, with n-hexane, n-heptane, n-octane or n-nonane being most preferred.

In step (c), the molar ratio of aluminum contained in the organic aluminum compounds to the transition metal contained in the solid catalyst may be 10 to 300. The organic aluminum compounds can be selected from the group consisting of alkyl aluminums, alkyl aluminum halides and aluminum alkoxides, such as triethyl aluminum($Al(C_2H_5)_3$), diethyl aluminum chloride($Al(C_2H_5)_2Cl$), triisobutyl aluminum($Al(i-C_4H_8)_3$), $Al_2(C_2H_5)_3Cl_3$, diisobutyl aluminum($Al(i-C_4H_9)_2H$), trihexyl aluminum($Al(C_6H_{13})_3$), diethyl aluminum($Al(C_2H_5)_2H$) and diethyl aluminum ethoxide($Al(C_2H_5)_2(OC_2H_5)$). Preferred are alkyl aluminums, with triethyl aluminum and triisobutyl aluminum being most preferred.

The polymerization reaction in step (c) can be carried out in gas phase or liquid phase, at normal pressure or at a pressure of 0.01 to 1.0 MPa. When employing liquid phase polymerization, it can be carried out in the absence or presence of an inert hydrocarbon diluent. The diluent may be hexanes, heptanes or octanes.

The alkyl metal compounds used in step ($a^1$) can be selected from the group consisting of alkyl aluminum compounds, alkyl alkaline earth metal compounds and alkyl zinc compounds. Preferred are alkyl aluminum compounds or alkyl alkaline earth metal compounds, such as alkyl magnesium compounds, triethyl aluminum or triisobutyl aluminum, with dibutyl magnesium, n-butyl ethyl magnesium and di-hexyl magnesium being more preferred.

According to the present invention, a sepiolite-palygorskite type clay, of which the monocrystals have a diameter of the order of nanometers, is used as the filling material and the composite is prepared by polymerizing olefins on the clay with active components supported thereon. The composite thus obtained has good interfacial adhesion between the clay and the polyolefin matrix, with the former uniformly dispersed in the latter in nanometric scales, thereby the composite has largely improved mechanical properites and thermal stability.

EXAMPLES

The following examples illustrate the present invention but are not limitative.

In the examples, the molecular weight of the composite is measured by Gel Permeation Chromatography(GPC) method; the tensile strength is measured according to ISO507-93, Vicat temperature is measured according to ISO306-94 and the Izod impact strength(notched) is measured according to ISO179-97.

In the examples, the Decalin-insolubles (decahydronaphthalene-insolubles) are used as a measure of the interaction degree in the interface between the two phases of the composite, which are measured as follows: the composite and Decalin are added to a Soxhlet, extractor in a ratio of 1000 ml Decalin per gram of the composite and then are extracted at the reflux temperature for 20 hours. After that time, the insolubles are dried and weighed.

Example 1

In this example a sepiolite/polyethylene nanocomposite is prepared.

2.0 g of sepiolite(natural minerals, available from Quanjiao, Anhui Province, China) is ground to powders and is then calcined at a temperature of 200° C. for 6 hours. Thus calcined clay is mixed with 100 ml of heptane to obtain a suspension, to which is added 1 ml of $TiCl_4$(Beijing Zhonglian Chemical Reagents Company, industrial grade). The resulting mixture is heated to reflux and then is reacted at reflux for 2 hours. The reaction mixture is filtered to obtain a solid, which is in turn washed three times at a temperature of 30 to 60° C. with 30 ml of hexane and then is dried at a temperature of 60° C. under nitrogen stream for 0.5 to 1 hour to obtain a solid catalyst with a titanium content of 1.9% by weight.

The inside of a 500 ml of three-necked flask, equipped with a stirrer and a thermostatic system, is displaced three times with nitrogen and then one time with ethylene. Subsequently, to the flask are added 200 ml of hexane, 4 ml of triisobutyl aluminum solution(1.5M in hexane) and 2.5 g of the solid catalyst in that order, the stirrer is started and then ethylene gas is fed. The mixture is reacted at a temperature of 40° C. and normal pressure for 2 hours, then the stirrer is stopped and 2 ml of ethanol is added to quench the reaction mixture. After separating hexane and the polymer, the resulting polymer is dried in an oven to obtain 40 g of composite as white powders.

The composite has a clay content of 4.7% by weight as measured by thermogravimetry. The molecular weight, mechanical properties and decalin-insolubles of the composite are summarized in Table 1.

An ultra-thinly sliced sample of the composite is analyzed by transmission electron microscopy(TEM) at a magnification of 20,000. The result is shown in FIG. 1, from which it can be seen that the clay fibers are uniformly dispersed in the polyethylene matrix in nanometric scales.

Example 2

Figure 2:
FIG. 2 is a TEM image of a sample of the composite prepared in Example 2 of the present invention(at a magnification of 150,000)

2.5 g of sepiolite is ground to powders and then is calcined as described in Example 1. To thus-calcined sepiolite is added 6 ml of triisobutyl aluminum solution(1.5M in hexane) and the resulting mixture is then stirred at a temperature of 200° C. for 2 hours. Subsequently, 1 ml of $TiCl_4$ is supported as described in Example 1 to obtain a solid catalyst. By using the catalyst, a polymerization reaction is carried out to obtain 200 g of composite as white powders, with a clay content of 1.6% by weight The mechanical properties and other test data of the composite are summarized in Table 1. An ultra-thinly sliced sample of the composite is analyzed by transmission electron microscopy at a magnification of 150,000. The result is shown in FIG. 2, from which it can be seen that the clay fibers have a thickness of 30–40 nanometers.

Example 3

Attapulgite(natural minerals, available from Jiashan, Anhui Province, China) is ground to powders and then is shaped by spraying to obtain microspheres with a diameter of 20 to 80 microns. A catalyst is prepared by using 3.5 g of attapulgite microspheres as described in Example 1 and then is used to carry out a polymerization reaction, thus providing 45 g of composite microspheres with a clay content of 8.7% by weight.

Figure 3:
FIG. 3 is a TEM image of a sample of the composite prepared in Example 3 of the present invention(at a magnification of 20,000)
Figure 4:
FIG. 4 is a TEM image of another sample of the composite prepared in Example 3 of the present invention(at a magnification of 20,000)

The mechanical properties and other test data of the composite are summarized in Table 1. An ultra-thinnly sliced sample of the composite is analyzed by transmission electron microscopy at a magnification of 20,000. The result is shown in FIG. 3, from which it can be seen that the clay fibers have a thickness less than 100 nanometers. FIG. 4 is a transmission electron microscopic(TEM) image of another sample of the composite, from which it can be seen that the clay fibers are uniformly dispersed in the polyethylene matrix in nanometric scales.

Example 4

A solid catalyst is prepared as described in Example 3 and then a polymerization reaction is carried out as follows.

The inside of a glass autoclave having a capacity of 1 liter is displaced three times with nitrogen and then one time with ethylene. To thus-displaced autoclave are fed 500 ml of hexane, 6 ml of triisobutyl aluminum solution (1.6M in hexane) and 2.5 g of the solid catalyst, followed by ethylene until the pressure within the autoclave reaches 0.7 MPa. Stirring is started and then the temperature is raised to 45° C. There resulting mixture is reacted at that temperature for 2 hours, with the pressure within the autoclave being maintained constant by continuously feeding ethylene. Then stirring is stopped and the reaction mixture is quenched by adding 2 ml of ethanol. After cooling at room temperature, the resulting suspension is filtered and the polymer is collected to obtain 94 g of composite with a particle size of 100 to 300 microns and a clay content of 3.3% by weight. The mechanical properties and other test data of the composite are summarized in Table 1.

Example 5

Figure 5:
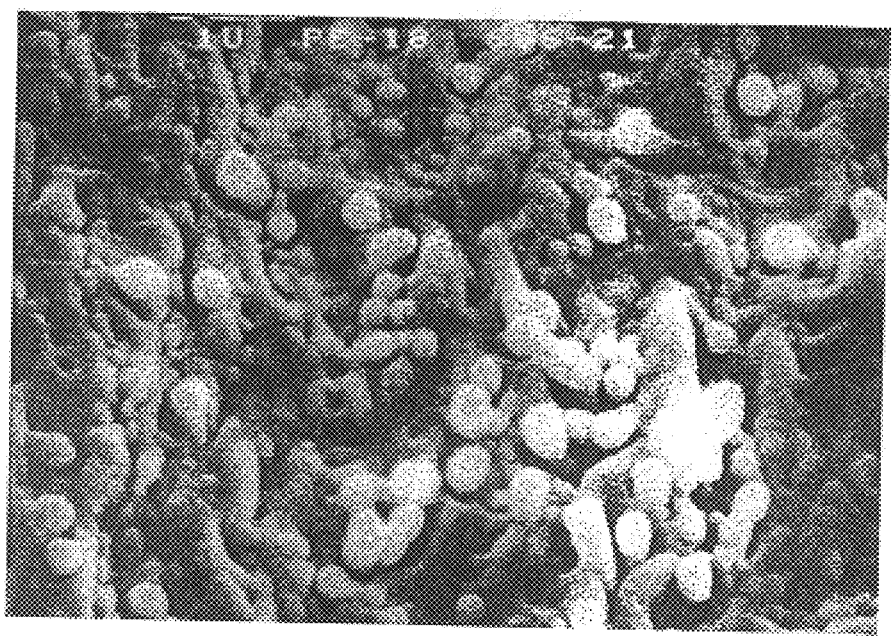
FIG. 5 is a cross-sectional scanning electron microscopic (SEM) image of a sample of the composite prepared in Example 5 of the present invention(at a magnification of 8,000)

A solid catalyst is prepared and then a polymerizaton reaction is carried out as described in Example 4 except that the polymerization time is changed to 4 hours. 150 g of composite is obtained, with a clay content of 2.3% by weight. The mechanical propreties and other test data of the composite are summarized in Table 1. The cross-section of the composite is analyzed by scanning electron microscopy at a magnification of 8,000. The result is shown in FIG. 5, from which it can be seen that attapulgite fibers are uniformly dispersed in polyethylene matrix and there is good interfacial adhesion therebetween.

Example 6

3.5 g of attapulgite micorspheres produced in Example 3, having a diameter of 20 to 80 microns, is calcined at a temperature of 500° C. for 6 hours, and then is added to 100 ml of hexane to form a suspension under stirring. To the suspension is added 0.1 ml of $TiCl_4$ and the resulting mixture is then reacted at the reflux temperature for 1 hour. Subsequently, the reaction mixture is washed and dried in a manner similar to Example 1 to obtain a solid catalyst with a titanium content of 1.1% by weight.

Figure 6:
FIG. 6 is a TEM image of a sample of the composite prepared in Example 6 of the present invention(at a magnification of 20,000).

By using the solid catalyst, a polymerization reaction is carried out as described in Example 4 to obtain 108 g of composite micospheres with a clay content of 2.4% by weight. The mechanical properties and other test data of the composite are summarized in Table 1. An ultra-thinnly sliced sample of the composite is analyzed by transmission electron microscopy at a magnification of 20,000. The result is shown in FIG. 6, from which it can be seen that the clay fibers are uniformly dispersed in the polyethylene matrix in nanometric scales.

Comparative Example 2.5 g of finely divided montmorillonite(preparation concentrate, available from Heishan, Liaoning Province, China) is dried in an atmosphere of nitrogen at a temperature of 200° C. for 6 hours and then a solid catalyst is prepared in a manner similar to that of Example 1 except that the amount of $TiCl_4$ is changed to 2 ml. The resulting solid catalyst has a titanium content of 2.1% by weight.

By using the solid catalyst prepared as above, a polymerization reaction is carried out as described in Example 1 except that the polymerization time is changed to 8 hours. A composite is obtained as white powders, of which the mechanical properties and other test data are summarized in Table 1.

TABLE 1

| Properties of the Materials | M. W.[1] (×10⁴) | T. S.[2] (MPa) | Elongation At break (%) | Vicat Temperature (° C.) | I. S.[3] (kJ/m²) | Decalin-Insolubles[4] (wt %) |
|---|---|---|---|---|---|---|
| Example 1 | 300 | 29.8 | 308 | 133.5 | 89.6 | 66.8 |
| Example 2 | 400 | 38.2 | 332 | 133.0 | 85.3 | 56.8 |
| Example 3 | 420 | 28.0 | 300 | 133.1 | 86.5 | 73.6 |
| Example 4 | 400 | 33.4 | 253 | 134.9 | 54.7 | 60.3 |
| Example 5 | 500 | 35.4 | 158 | 132.9 | 72.3 | 54.5 |
| Example 6 | 480 | 40.8 | 266 | 132.8 | 73.1 | 53.9 |
| Comp. Ex.[5] | 260 | 19.0 | 326 | 130.0 | 68.8 | 23.6 |

Note:
[1]Molecular Weight;
[2]Tensile Strength;
[3]Impact Strength;
[4]Based on the total weight of the composite;
[5]Comparative Example.

What is claimed is:

1. A polyolefin/clay nanocomposite comprising from 90.0 to 99.0% by weight of a polyolefin and 1.0 to 10.0% by weight of a clay selected from the group consisting of sepiolite, palygorskite and attapulgite.

2. The nanocomposite according to claim 1, wherein said polyolefin is poly-α-$C_2$~$C_6$olefin.

3. The nanocomposite according to claim 1, wherein said polyolefin is polyethylene or a copolymer of ethylene with a comonomer selected from the group consisting of propylene, 1-butene, 1-pentene, 1-hexene and 1-octene.

4. The nanocomposite according to claim 1 having decahydronaphthalene-insolubles of 53.9 to 73.6 by weight, based on the total weight of said nanocomposite.

5. A process for preparing the polyolefin/clay nanocomposite of claim 1, comprising:

(a) calcining clay selected from the group consisting of sepiolite, palygorskite, and attapulgite in an atmosphere of air or an inert gas at a temperature of 100 to 850° C. for 0.5 to 10.0 hours;

(b) reacting thus-calcined clay with a transition metal compound in an inert hydrocarbon solvent at a temperature of 0 to 200° C. for 0.5 to 6.0 hours to obtain a solid product, in which the transition metal compound is used in an amount of 0.05 to 100 millimoles per gram of clay; and (c) polymerizing an olefin at a temperature of 20 to 150° C., with the solid product from step (b) as the catalyst and an organic aluminum compound as the co-catalyst.

6. The process according to claim 5, further comprising a step ($a_1$) of treating said clay calcined in step (a) with an alkyl metal compound, said alkyl metal compound being selected from the group consisting of alkyl aluminum compounds, alkyl alkaline earth metal compounds and alkyl zinc compounds.

7. The process according to claim 6, wherein said step ($a_1$), the clay calcined in step (a) is suspended in an inert hydrocarbon solvent, the alkyl metal compound is added in an amount of 0.05 to 100 millimoles per gram of clay to the resulting suspension and then the resulting mixture is reacted at a temperature of 0 to 200° C. for 0.5 to 6.0 hours.

8. The process according to claim 5 or 7, wherein said inert hydrocarbon solvent is selected from the group consisting of $C_5$~$C_{10}$alkane, gasoline, kerosine and petroleum ether.

9. The process according to claim 5, wherein the transition metal compound used in step (b) is one of halides, oxyhalides, $C_1$~$C_{12}$alkoxyhalides or hydrohalides of a transition metal selected from the group consisting of titanium, zirconium, hafnium, vanadium, nickel, scandium, niobium, tantalum, and the mixtures of any two of them.

10. The process according to claim 5, wherein step (c), the molar ratio of aluminum contained in the organic aluminum compound to the transition metal contained in the solid product is from 10 to 300.

* * * * *